United States Patent [19]

Desmond et al.

[11] Patent Number: 4,482,639

[45] Date of Patent: Nov. 13, 1984

[54] CATALYSTS FOR THE POLYMERIZATION OF ETHYLENE

[75] Inventors: Michael J. Desmond, Cleveland Heights; Kenneth C. Benton; Raymond J. Weinert, both of Garfield Heights, all of Ohio

[73] Assignee: The Standard Oil Company, Cleveland, Ohio

[21] Appl. No.: 418,320

[22] Filed: Sep. 15, 1982

[51] Int. Cl.$^3$ .......................... C08F 4/62; C08F 4/64; C08F 4/68; C08F 4/70

[52] U.S. Cl. .................................... 502/117; 502/118; 502/121; 502/122; 502/123; 502/125; 502/154; 526/139; 526/140; 526/141; 526/142; 526/161

[58] Field of Search ........... 252/429 B, 431 R, 431 C, 252/431 N, 431 P; 502/118, 122, 121, 123, 125, 117, 154

[56] References Cited

U.S. PATENT DOCUMENTS

| | | | |
|---|---|---|---|
| 3,511,891 | 5/1970 | Taylor et al. | 252/429 B X |
| 3,644,218 | 2/1972 | Dunn | 252/431 R X |
| 3,670,043 | 6/1972 | Kubicek et al. | 252/431 R X |
| 3,677,968 | 7/1972 | Bozik et al. | 252/431 N |
| 3,904,704 | 9/1975 | Bryson | 252/431 N X |
| 4,004,071 | 1/1977 | Aishima et al. | 526/116 |
| 4,051,307 | 9/1977 | Caunt et al. | 252/429 B X |
| 4,071,673 | 1/1978 | Hwang | 252/431 R X |
| 4,161,461 | 7/1979 | Caunt et al. | 252/429 B |
| 4,180,636 | 12/1979 | Hirota et al. | 252/429 B X |
| 4,204,050 | 5/1980 | Bressler et al. | 252/429 B X |
| 4,233,182 | 11/1980 | Hoff et al. | 252/429 B X |

OTHER PUBLICATIONS

Desmond, "Part I; Catalytic Reactions of Anion-Exchanger Resin Bound Dodecarhodium Triacontacarbonyl Dianion and Its Derivatives and Part II: Properties and Reactions of Neutral Non-Polar Solvent Soluble Binuclear Complexes", Dept. of Chemistry, U. of Ill. at Urbana-Champaign, 1980, pp. 1–225.

*Primary Examiner*—Patrick Garvin
*Attorney, Agent, or Firm*—David P. Yusko; John E. Miller, Jr.; Larry W. Evans

[57] ABSTRACT

Ethylene is polymerized by a catalyst system comprised of a transition metal complex consisting of at least one binucleating ligand attached to at least one transition metal containing nucleus; and an organometallic cocatalyst containing at least one element of Group IA, IIA or Group IIIA.

32 Claims, No Drawings

CATALYSTS FOR THE POLYMERIZATION OF ETHYLENE

BACKGROUND OF THE INVENTION

1. Field of the Invention

This invention relates to the polymerization of ethylene. More specifically, this invention relates to catalyst system for the polymerization of ethylene.

2. Description of Prior Art

Many catalysts have been developed for the polymerization of ethylene and alpha-olefins. One of the earliest and perhaps the most well known is the Ziegler catalyst consisting of a chemical complex derived from a transition metal halide and a metal hydride or a metal alkyl. Other caytalysts include a variety of transition metal compounds used in combination with organometallic aluminum and/or magnesium compounds.

Despite the large amount of work done in this area, scientists and chemists continue to search for improved polymerization catalysts.

SUMMARY OF THE INVENTION

A catalyst system for the polymerization of ethylene has been developed. This catalyst system is comprised of a transition metal complex catalyst, consisting of at least one binucleating ligand which attaches to at least one nucleus which contains at least one transition metal, and a cocatalyst of at least one organometallic compound containing at least one element of Group IA, Group IIA or Group IIIA.

DETAILED DESCRIPTION OF THE INVENTION

Ethylene

Ethylene is an unsaturated aliphatic hydrocarbon consisting of two carbon atoms joined by a double bond. At room temperature ethylene is a colorless gas with a sweet odor and taste. Ethylene is a well known commercially available material and needs no further description here.

The Catalyst System

The catalyst system consist of two components. The first component or catalyst is a transition metal complex of at least one ligand which attaches to at least one nucleus, but more commonly simultaneously attaches to two nuclei. The transition metals employed in this complex include those elements with the Atomic Number 22 through 30 of the Periodic Table of Elements, which will be subsequently referred to simply as transition metals. The second component or cocatalyst is at least one organometallic compound containing at least one element of Group IA, Group IIA and Group IIIA of the Periodic Table of Elements. The Periodic Table referred to herein is that appearing in the *Handbook of Chemistry and Physics*, 61st ed., Chemical Rubber Co. (1980).

The Catalyst

The transition metal complex catalyst contains at least one ligand. As here used, a ligand is a molecule, ion, or atom that is attached to the central atom or molecule of a coordination compound. A ligand which attaches to two central atoms or molcules is a binucleating ligand. A binucleating ligand is further defined to be a ligand which has the ability to bond in a multidentate fashion to two metal containing centers. The catalysts of the instant invention preferably utilize a binucleating ligand. However, where the nucleus, i.e. the central atom or molecules, is large, a single nucleus will satisfy the bonding requirements of the normally binucleating ligand.

The transition metal complex consists of a binucleating ligand attached to at least one nucleus, which contains at least one transition metal. Preferably the binucleating ligand simultaneously attaches to two nuclei. Preferably both nuclei contain at least one transition metal. It is not mandatory that both nuclei contain the same elemental components. Optionally the second nucleus may contain at least one metal from Group I, Group IIA and Group IIIA of the Periodic Tables. As here used and throughout the specification and claims, when a nucleus is said to "contain" an element or compound, then that nucleus is either that element or compound per se or the nucleus is a larger composition which includes that element or compound.

The transition metal complex of at least one binucleating ligand is a coordination compound. The bonding in a coordination compound is neither covalent nor electrostatic but is usually considered to be an intermediate between the two types. For purposes of this specification, a dotted line will be used in formulas and structures of transition metal complexes in order to show the locations of this coordination compound type bonding.

Preferred transition metal complexes of binucleating ligands are:

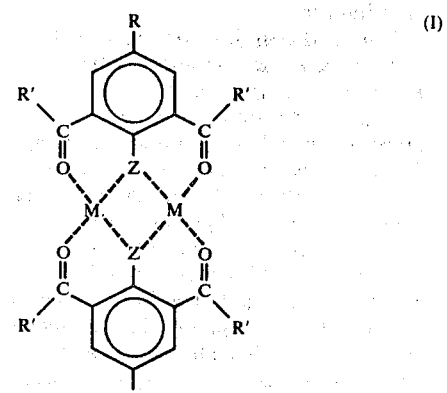

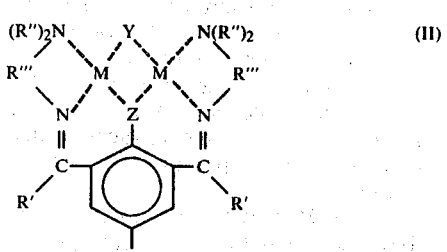

-continued

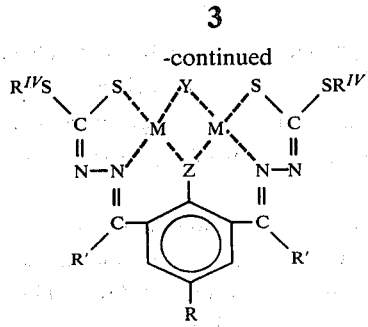
(III)

Each R and $R^{IV}$ are independently hydrogen or an aliphatic, cycloaliphatic or aromatic radical or an inertly substituted derivative of any one of these. Preferably each R and $R^{IV}$ are independently a $C_1$ to $C_{20}$ aliphatic radical, a $C_5$ to $C_7$ cycloaliphatic radical, phenyl radical or an inertly substituted derivative of any one of these. More preferably each R and $R^{IV}$ are a $C_1$ to $C_{12}$ alkyl radical.

Each R' and R" are independently hydrogen or an aliphatic radical or an inertly substituted derivative thereof. Preferably each R' and R" are independently hydrogen or a $C_1$ to $C_6$ aliphatic radical or an inertly substituted derivative thereof. More preferably each R' and R" are independently hydrogen or a $C_1$ to $C_6$ alkyl radical. Most preferably each R' and R" are hydrogen or a methyl radical.

Each R'" is independently an aliphatic, cycloaliphatic or aromatic radical or an inertly substituted derivative of any one of these. Preferably each R'" is independently a $C_1$ to $C_8$ aliphatic radical, a $C_5$ to $C_7$ cycloaliphatic radical, a phenyl radical or an inertly substituted derivative of any one of these.

Each M denotes a nucleus of the binucleating ligand. Each M contains at least one element of Atomic No. 22 through 30, Group IA, Group IIA and Group IIIA of the Periodic Table with the proviso that at least one M contains an element of Atomic No. 22 through 30, i.e. a transition metal.

Where M contains a transition metal, each M may be:

1. at least one transition metal. Preferred transition metals are vanadium and titanium.

2. a coordination compound containing at least one transition metal. A coordination compound is formed by the union of a metal ion with a nonmetallic ion or molecule called a ligand. A coordination compound may consist of one ligand or several ligands attached to a central atom or molecule called the nucleus. The transition metal is contained in the nucleus of the coordination compound. The ligands may be monadentate or multidentate. Suitable ligands include but are not limited to any alkoxide, azide, halide, sulfide, carboxylate, nitrate, sulfate, phosphate, perchlorate, amine, ether, thioether, phosphine, arsine, an oxime. Preferred coordination compounds are dialkoxy titanium, dichloro titanium and acetylacetonyl titanium.

3. A compound containing at least one transition metal and at least one of oxygen, sulfur and selenium. Compounds containing a transition metal bonded to oxygen are preferred. Vanadium or titanium bonded to oxygen are more preferred. Vanadyl (V=O) is most preferred.

Where M contains an element of Group IA, Group IIA and Group IIIA, preferred elements are hydrogen, beryllium, magnesium and calcium with magnesium more preferred.

Typically each M contains at least one transition metal. However, a preferred embodiment of this invention is where one M contains a transition metal and the other M contains a non-transition metal, specifically one M is titanium and the other M is magnesium.

Y is any coordinating anion. Suitable coordinating anions are at least one of any alkoxide, halide, azide, hydroxide, cyanide, isocyanide, pyrazolate, amide, imidazolate and hydrazide. Preferred coordinating anions are any alkoxide, halide, azide, hydroxide. Most preferred coordinating anions are ethoxy and chlorine.

Z is one of oxygen or sulfur.

Typically the ligands and the resulting transition metal complexes shown in formulas I, II and III are prepared by sequential displacement reactions in solution. The reactions and techniques required to make these compounds are well known to those skilled in the art of inorganic and organic synthesis.

The Cocatalyst

The cocatalyst is an organometallic compound containing at least one element of Group IA, Group IIA, and Group IIIA. An organometallic compound is comprised of a metal attached directly to a carbon atom. The elements of Group IA, Group IIA and Group IIIA of the Periodic Table suitable for use in the cocatalyst are lithium, sodium, potassium, cesium, beryllium, magnesium, calcium, strontium, boron, aluminum and gallium. Preferred cocatalysts are di-sec-butylmagnesium, n-butylmagnesium chloride, aluminum triethyl and compounds of the formula:

$$(R^V)_n AlX_{(3-n)}$$

where $R^V$ is at least one of an aliphatic, cycloaliphatic or aromatic radical or an inertly substituted derivative of any one of these, X is a halide and n is less than or equal to 3, but greater than 0.

Preferably $R^V$ is at least one of a $C_1$ to $C_8$ aliphatic radical, a $C_5$ to $C_7$ cycloaliphatic radical or a phenyl radical. More preferbly $R^V$ is at least one of an alkyl, aryl, arylalkyl, alkenyl or arylalkenyl radical or an inertly substituted derivative of any one of these. Most preferaby $R^V$ is at least one of an ethyl, isopropyl, sec-butyl, isobutyl, cyclohexyl, phenyl, benzyl, 1-octenyl and 1-phenyl-1-heptenyl radical.

Preferably X is at least one of chlorine, bromine and iodine. More preferbly X is chlorine.

The more preferred cocatalysts include ethylaluminum dichloride, ethylaluminum sesquichloride and diethylaluminum chloride. Ethylaluminum dichloride is the most preferred cocatalyst.

Organometallic compounds are frequent cocatalysts in catalyst systems and their preparation is known to those skilled in the art. These catalysts are readily synthesized and many are commercially available.

Typically the transition metal complex catalyst and the organometallic compound cocatalyst are mixed in an inert diluent. The mole ratio of the organometallic compound cocatalyst to the transition metal complex catalyst is between approximately 1:1 and 300:1, preferably between approximately 3:1 and 50:1.

Polymerization

The polymerization of ethylene may be performed by any method known to those skilled in the art. Typically it is advantageous to polymerize ethylene in the presence of an aromatic, an aliphatic or a halogenated hydrocarbon solvent. Many of the transition metal complexes and organometallic complexes are soluble in such solvents. The catalyst system dissolved in a solvent leads to the greatest efficiency of use of the catalytic metal species.

In one embodiment, the transition metal complex and organometallic compound are first dissolved in a small quantity of solvent. This solution is then added to a larger quantity of an inert diluent to form a heterogenous solution. An inert diluent is a diluting agent which does not react with the catalyst or the cocatalyst, and in which the catalyst is insoluble. The volume ratio of the solvent siolution to the inert diluent is between 5:1 and 50:1. Suitable solvents are aromatic hydrocarbons, or inertly substituted derivative thereof, or a halogenated aliphatic hydrocarbon. Suitable inert diluents are aliphatic and alicyclic hydrocarbons. Preferred inert diluents are n-hexane, n-heptane, 2,2,4-trimethylpentane, and cyclohexane.

Typically the mole ratio of ethylene to catalyst is between 100:1 and $1 \times 10^9$:1. However, essentially any amount of catalyst is sufficient to support some ethylene polymerization. The polymerization may be conducted at pressures of approximately 1 to 100 atmospheres and temperatures of approximately 30° C. to 200° C. The preferred conditions for polymerization are pressures of approximately 2 to 60 atmospheres and temperatures of approximately 40° C. to 135° C.

After polymerization, the catalyst system can be recovered from the polyethylene by washing the polymer with an inert solvent in which the catalyst and the cocatalyst are soluble. Suitable solvents for washing are aromatic hydrocarbons and inertly substituted derivatives thereof, halogenated aliphatic hydrocarbons, and oxygenated hydrocarbons such as ketones, aldehydes and ethers. Preferred solvents are benzene, toluene and xylene.

The catalyst system of this invention has several advantages for use in ethylene polymerization. The catalyst system is highly active. The system is efficient in the use of the catalytic metal. The catalysts are insensitive to atmospheric contamination and are thus easily handled. The solubility of the transition metal complex can be tailored to specific requirements by altering the binucleating ligand. The catalyst system is easily recovered and recycled by simple washing with a solvent.

The polyethylene obtained with this catalyst system is extremely linear. Polyethylene has been obtained with essentially no methyl branching detected by carbon-13 nuclear magnetic resonance spectroscopy in over 48 hours of scanning. This entailed approximately 25,000 scans on a Varian XL 100 with a limit of detectability equal to 3-6 $CH_3$ per 10,000 C. In comparison, a commercial high density polyethylene exhibits approximately 20 $CH_3$ per 10,000 C.

The polyethylene obtained by this catalyst system also exhibits higher crystallinity than polyethylene obtained by a catalyst system containing vanadium oxytrichloride and various commercially available high density polyethylenes.

SPECIFIC EMBODIMENTS

A preferred embodiment of the invention is a catalyst system comprised of vanadyl complexes of the binucleating ligand, 4-tert-butyl-[bis-2,6-N-(S-heptyldithiocarbamate)formimidoly]-phenol, and ethylaluminum dichloride. The following examples and comparisons which describe the preparation an use of this catalyst system are provided in order to better illustrate the instant invention.

EXAMPLE I

Preparation of the Catalyst

Preparation of the Ligand 50 g sodium hydroxide were dissolved in approximately 1.2 liters of water, and 150 g of 4-tert-butylphenol were added to this solution. The mixture was stirred and gently heated until the phenol dissolved. The solution was then cooled to ambient temperature. Aqueous formaldehyde (175 ml, 37%) was added, and the solution was stirred for four to six days at ambient temperature. Concentrated hydrochloric acid (110 ml) was added, upon which a two-phase system forms. A yellow, oily organic phase was isolated and washed with three 500 ml portions of water. Chloroform (700 ml) and 500 ml of water were added to this organic oil and the mixture was stirred. The organic phase was isolated and dried over 100 g of anhydrous magnesium sulphate. Evaporation and cooling of the chloroform solution yielded a mixture of white crystals and oil. The addition of 50-100 ml of chloroform and filtration yielded a white crystalline product, 4-tert-butyl-2,6-di(-hydroxymethyl) phenol.

The 4-tert-butyl-2,6-di(hydroxymethyl) phenol (94.6 g) was added to 300 ml of water containing 23 g of sodium hydroxide. Toluene sulfonylchloride (90 g) and 100 ml of benzene were also added. The system was stirred vigorously for two days, filtered, an the white solid product was washed with three 100 ml aliquots of benzene. A 50-70% yield of the tosylated diol was obtained.

The tosylated diol (102 g) was dissolved with heating and stirring in 400 ml of glacial acetic acid. The solution was heated nearly to boiling and 86.3 g of sodium dichromate monohydrate were added very slowly. Upon cooling, the dark green solution yielded a powdery solid. The product was separated from the chromous salt solution and washed with water and 3:1 water:ethanol. The product was then dissolved in boiling ethanol to form an approximately 20 wt./vol % solution. About 10 vol % water was added and the solution was cooled while stirring. The pale green crystals of the tosylated diformylphenol which form were recovered by filtration and washed with 1:1 ethanol:water.

The tosylated diformyl compound (30 g) was then dissolved in 35 ml of concentrated sulfuric acid and stirred for at least 30 minutes. The solution was then poured slowly into a 800 ml beaker containing 600 ml of crushed ice. The pink-brown solid which formed was stirred in the ice-water mixture for at least two hours, then recovered by filtration, washed with water, and dried on the filter. The solid was extracted with mixed hexanes, using approximately one liter of hexane per 10 g of solid, until only a purple-red tar remained. The hexane solution was then evaporated to yield the yellow solid, 4-tert-butyl-6-formylsalicylaldehyde. The overall yield was generally of the order of 10-20%.

A solution of 34.2 g of potassium hydroxide in 190 ml of absolute ethanol and 20 ml of water was prepared. To this solution was added 34.8 g of 85% hydrazine hydrate. The solution was cooled in a sodium chloride-ice-water bath and stirred vigorously while adding dropwise over a two-hour period a solution of 36 ml of carbon disulfide in 39 ml of absolute ethanol, maintaining the reaction temperature at less than 3° C. Filtration of the reaction mixture yielded a white solid, potassium was removed on a rotary evaporator. An olive green solid was obtained in a 60-90% yield. This solid is a coordination compound of the following structure:

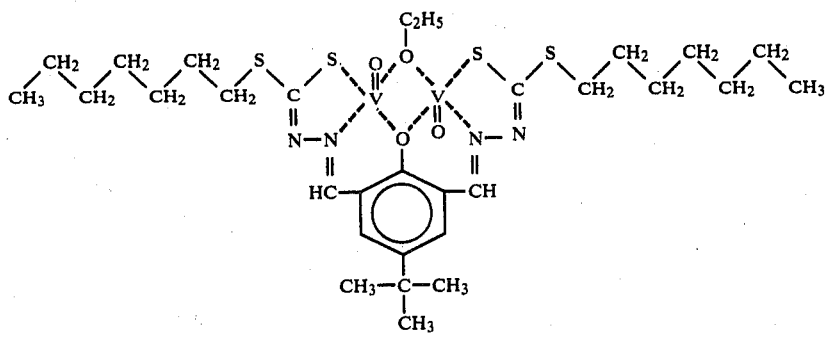

dithiocarbazate.

A solution of 26 g of potassium dithiocarbazate in 50 ml of 40% aqueous ethanol was prepared and 44 g of 1-iodoheptane were added. The mixture was stirred at ambient temperature for two days. The reaction flask was wrapped in aluminum foil to prevent the photodecomposition of the heptyliodide. The solution was then cooled in an ice bath and quickly filtered to recover the white solid, S-heptyldithiocarbazate. A yellow oil by-product was then removed by washing the white solid with ligroine. The product was then recrystallized from boiling hexane.

Solutions consisting of 8 g of the freshly-recrystallized S-heptyl-dithiocarbazate in 500 ml of 1:1 ethanol:water and 4.00 g of 4-tert-butyl-6-formylsalicylaldehyde in 200 ml of ethanol were prepared. The two solutions were heated to boiling and quickly filtered. The two solutions were again heated to boiling, and the dialdehyde solution was added, with rapid agitation, to the S-heptyldithiocarbazate solution. A yellow precipitate formed almost immediately. The reaction mixture was allowed to boil for two minutes, then was cooled while stirring, and the yellow solid was isolated by filtration. The product, 4-tert-butyl-bis-2,6-N-(S-heptyl-dithiocarbamate)-formimidoyl-phenol, was washed with three 300 ml portions of 1:1 ethanol:water, followed by two 200 ml portions of 95% ethanol. This yellow crystalline solid is a ligand of the following structure:

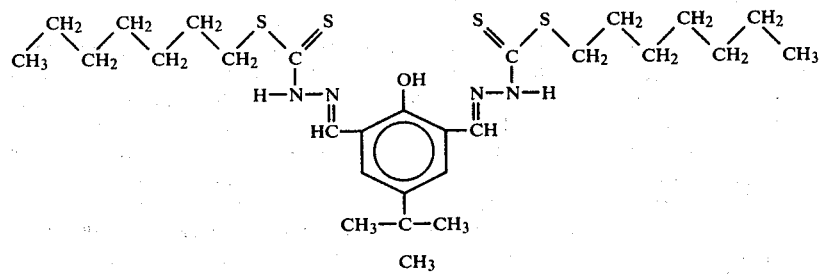

Preparation of Transition Metal Complex of the above Bi-Nucleating Ligand:

Vanadyl acetate (389 mg) was combined with 583 mg of the ligand in 25 ml. of absolute ethanol. The mixture was stirred at ambient temperature for one to three weeks. The reaction mixture was filtered and the solid washed on the filter with ethanol and toluene. The unreacted vanadyl acetate remained on the filter. The filtrate and washings were combined and the solvent The structure of the above ligand and the coordination compound has been confirmed by Infrared Spectroscopy, Nuclear Magnetic Resonance Spectroscopy and Mass Spectroscopy.

EXAMPLE II

Catalyst Use and Comparison

The Catalysts.

The bis-vanadyl complex of 4tert-butyl-[bis-2,6-N-(S-heptyldithiocarbamate)-formimidoyl]-phenol, which will be referred to as $(VO)_2Ligand(OEt)$ was prepared as described above. This catalyst was compared with vanadium oxytrichloride ($VOCl_3$) and vanadium triacetylacetonate, $V(AcAc)_3$, which are commerically available ethylene polymerization catalysts. A common activator, ethylaluminum dichloride [EADC], was used in conjunction with all of the above catalysts. This cocatalyst is also commercially available. The effect of EADC acting by itself as an ethylene polymerization catalyst was also investigated.

Process Steps, Conditions and Apparatus

Polymerization was conducted in a clean, dry 7 oz. crown cap bottle containing a Teflon magnetic spin bar. The bottle was equipped with gas feed via a hypodermic needle through its removable cap which was also equipped with a sealable vent.

A small amount of catalyst was added to the bottle along with 75 ml of dry toluene (MC&B Omni-Solv, dried over 4 A molecular seives). The bottle was sealed and then purged for 20 minutes with Argon.

The bottle was then placed in a constant temperature bath at 60° C. which was set upon a magnetic stirring box. After allowing 10 to 30 minutes for the system to attain thermal equilibrium, the bottle was pressurized to 40 psig with ethylene.

0.2 ml of n-heptane containing 25% by wt. EADC was then injected into the bottle. Polymerization began immediately as evidenced by the precipitation of white polyethylene in the bottle.

When the formation of polyethylene ceased, the ethylene flow was discontinued and the excess ethylene was vented. The polymer slurry was poured into approximately one liter of methanol and the product was isolated by vacuum filtration. The polymer was washed on the filter with 200 ml of methanol and dried at 50° C. under reduced pressure for 18 hrs. The results of the polymer yields obtained with the different catalysts are shown in Table I.

TABLE I

Polymerization of Ethylene by Various Catalysts/EADC Systems

| Experiment No. | Catalyst | Al/V[1] Ratio | Yield (gPE)[2] | Mileage[3] (gPE/gV) |
|---|---|---|---|---|
| A | EADC | — | 0 | 0 |
| 1 | (VO)$_2$Ligand(OEt)[4] | 32 | 1.00 | 413 |
| 2 | VOCl$_3$[4] | 60 | 0.68 | 500 |
| 3 | V(AcAc)$_3$[4] | 6 | 0.98 | 155 |

[1]Al/V ratio is a means to compare the number of aluminum atoms in the cocatalyst to the number of vanadium atoms in the catalyst.
[2]gPE is grams of Polyethylene.
[3]Mileage (gPE/gV) is a measure of the catalysts productivity of polyethylene per gram of vanadium contained in the catalyst.
[4]In these runs the EADC cocatalyst was added in two increments, the second addition taking place after the polymerization resulting from the first addition had slowed or ceased.

EXAMPLE III

Crystallinity Comparison

Polyethylene was prepared from the (VO)$_2$Ligand (OEt)/EADC system and a VOCl$_3$/EADC system in a manner similar to that described in Example I. The crystallinity of the polyethylene produced by these two methods as well has the crystallinity of commercial grade high density polyethylene produced by Hercules Inc. were measured by X-ray diffraction. The results of the crystallinity measurements are shown in Table II.

TABLE II

Crystallinity Comparison of Polyethylene produced from Different Catalysts.

| Catalyst System | Average Percent Crystallinity | Number of Trials |
|---|---|---|
| (VO)$_2$Ligand (OEt)/EADC | 74 ± 4 | 8 |
| VOCl$_3$/EADC | 65 ± 2 | 3 |
| Commercial HDPE-Catalyst Unknown[1] | 71 ± 3 | 4 |

[1]Catalyst believed to be cobalt.

The data in Table I indicates that the vanadyl complex of the binucleating ligand is nearly as productive as the popular VOCl$_3$ catalyst and many times more productive than V(AcAc)$_3$. Table I also reveals that the cocatalyst in the absence of the catalyst has no catalytic effect.

The data in Table II indicates that the crystallinity of the polyethylene produced by the vanadyl complex of a binucleating ligand catalyst is significantly more crystalline than the polyethylene produced by the VOCl$_3$ catalyst and slightly more crystalline than commerically available HDPE.

The invention claimed is:

1. A catalyst system for the polymerization of ethylene comprising:
   (a) at least one transition metal complex of at least one binucleating ligand, which attaches to at least one nucleus containing at least one transition metal element of Atomic No. 22 through 30 of the Periodic Table of Elements, and
   (b) an organometallic compound containing at least one element of Group IA, Group IIA or Group IIIA of the Periodic Table of Elements.

2. The catalyst system of claim 1 wherein the transition metal complex comprises at least one binucleating ligand which simultaneously attaches to two nuclei which independently contain at least one transition metal element of Atomic No. 22 through 30 of the Periodic Table of Elements.

3. The catalyst system of claim 1 where the transition metal complex comprises at least one binucleating ligand which simultaneously attaches to two nuclei, one of which contains at least one transition metal element of Atomic No. 22 through 30 of the Periodic Table of Elements, and the other of which contains at least one element of Group IA, Group IIA and Group IIIA of the Periodic Table of Elements.

4. The system of claim 2 or 3 where the transition metal complex is at least one of

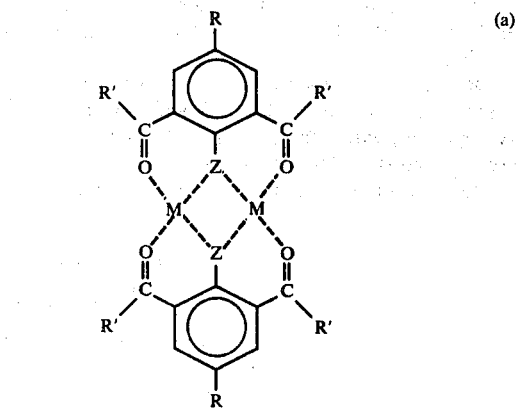

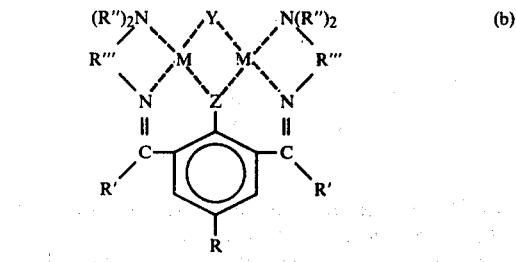

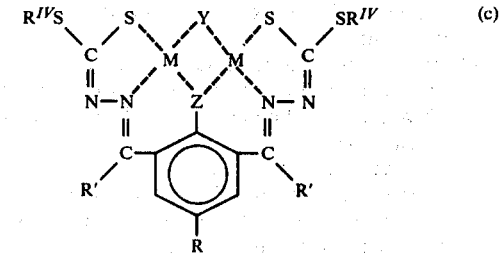

where
each R and R$^{IV}$ are independently hydrogen, or an aliphatic, cycloaliphatic, or aromatic radical or an inertly substituted derivative of any one of these;
each R' and R" are independently hydrogen or an aliphatic radical or an inertly substituted derivative thereof;

each R''' is independently an aliphatic or aromatic radical or an inertly substituted derivative of any one of these; each M contains at least one element of Atomic No. 22 through 30, Group IA, Group IIA and Group III of the Periodic Table of Elements with the proviso that at least one M contains at least one element of Atomic No. 22 through 30;

Y is any coordinating anion; and

Z is one of oxygen and sulfur.

5. The catalyst system of claim 4 where each R and $R^{IV}$ are independently one of a $C_1$ to $C_{20}$ aliphatic radical, a $C_5$ to $C_7$ cycloaliphatic radical, a phenyl radical and an inertly substituted derivative of any one of these.

6. The catalyst system of claim 5 where each R and $R^{IV}$ are independently an alkyl radical of 1 to 12 carbon atoms.

7. The catalyst system of claim 4 where each R' and R'' are independently one of hydrogen, an aliphatic radical of 1 to 6 carbon atoms and an inertly substituted derivative thereof.

8. The catalyst system of claim 7 where each R' and R'' are independently one of hydrogen, a $C_1$ to $C_6$ alkyl radical and an inertly substituted derivative thereof.

9. The catalyst system of claim 8 where each R' and R'' are independently one of hydrogen and a methyl radical.

10. The catalyst system of claim 4 where each R''' is independently one of a $C_1$ to $C_8$ aliphatic radical, a $C_5$ to $C_7$ cycloaliphatic radical, a phenyl radical and an inertly substituted derivative of any one of these.

11. The catalyst system of claim 4 where each M, which contains an element of Atomic No. 22 through 30, is independently one of:
(a) at least one transition metal element of Atomic Number 22 through 30 of the Periodic Table of Elements;
(b) a coordination compound containing at least one transition metal element of Atomic Number 22 through 30 of the Periodic Table of Elements in its nucleus; and
(c) at least one transition metal element of Atomic Number 22 through 30 of the Periodic Table of Elements combined with at least one of oxygen, sulfur and selenium.

12. The catalyst system of claim 11 where at least one M is independently at least one coordination compound comprised of at least one ligand of any alkoxide, azide, halide, sulfide, carboxylate, nitrate, sulfate, phosphate, amine, ether, thioether, phosphine, arsine, and oxime and containing at least one transition metal element of Atomic Number 22 through 30 of the Periodic Table of Elements.

13. The catalyst system of claim 12 where at least one M is independently one of dialkoxy titanium, dichloro titanium and acetylacetonyl titanium.

14. The catalyst system of claim 11 where at least one M is independently at least one transition metal element of Atomic Number 22 through 30 bonded to oxygen.

15. The catalyst system of claim 14 where at least one M is independently one of vanadium bonded to oxygen and titanium bonded to oxygen.

16. The catalyst system of claim 14 where at least one M is independently vanadyl.

17. The catalyst system of claim 4 where one M contains at least one transition metal element of Atomic No. 22 through 30 and the other M is at least one of hydrogen, beryllium, magnesium and calcium.

18. The catalyst system of claim 17 where one M contains at least one transition metal of Atomic No. 22 through 30 and the other M is hydrogen.

19. The catalyst system of claim 17 where one M contains at least one transition metal of Atomic No. 22 through 30 and the other M is magnesium.

20. The catalyst system of claim 19 where one M contains titanium and the other M contains magnesium.

21. The catalyst system of claim 4 where Y is at least one of any alkoxide, halide, azide, hydrazide, hydroxide, cyanide, isocyanide, pyrozolate, amide and imidazolate.

22. The catalyst system of claim 20 where Y is one of ethoxy and chloride.

23. The catalyst system of claim 4 where the ligand is of the following structure:

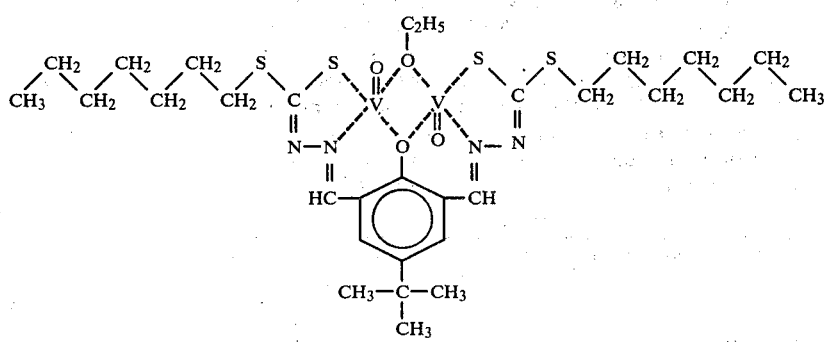

24. The catalyst system of claim 1 where the organometallic compound contains at least one of lithium, sodium, potassium, cesium, beryllium, magnesium, calcium, strontium, boron, aluminum, and gallium.

25. The catalyst system of claim 24 where the organometallic compound is at least one of:
(a) di-sec-butylmagnesium;
(b) n-butylmagnesium chloride;
(c) aluminum triethyl and
(d) compounds of the formula: $(R^V)_n AlX_{(3-n)}$ where $R^V$ is at least one of an aliphatic, cycloaliphatic and aromatic radical of 1 to 8 carbon atoms,
X is a halide and
n is less than or equal to 3 but greater than 0.

26. The catalyst system of claim 24 of the formula $(R^V)_n AlX_{(3-n)}$ where $R^V$ is at least one of an alkyl, aryl, arylakyl, alkenyl and arylalkenyl radical.

27. The catalyst system of claim 25 where $R^V$ is at least one of an ethyl, isopropyl, sec-butyl, isobutyl, cyclohexyl, phenyl, benzyl, 1-octenyl and 1-phenyl-1-heptenyl radical.

28. The catalyst system of claim 24 of the formula $(R^V)_n AlX_{(3-n)}$ where X is at least one of chlorine, bromine and iodine.

29. The catalyst system of claim 27 where X is chlorine.

30. The catalyst system of claim 24 where the compound of the formula $(R^V)_n AlX_{(3-n)}$ is at least one of ethylaluminum dichloride, ethylaluminum sesquichloride and diethylaluminum chloride.

31. The catalyst system of claim 1 where the mole ratio of the organometallic compound to the transition metal complex is between approximately 1:1 and 300:1.

32. The catalyst system of claim 30 where the ratio of the organometallic compound to the transition metal complex is between approximately 3:1 and 50:1.

* * * * *